Figure 1:

F. E. IVES.
COLOR PHOTOGRAPH OR FILM AND METHOD OF PRODUCING SAME.
APPLICATION FILED OCT. 9, 1917.

1,278,668.  Patented Sept. 10, 1918.

Inventor
Frederic E. Ives,
By his Attorneys
Rogers, Kennedy Campbell.

UNITED STATES PATENT OFFICE.

FREDERIC EUGENE IVES, OF PHILADELPHIA, PENNSYLVANIA.

COLOR PHOTOGRAPH OR FILM AND METHOD OF PRODUCING SAME.

1,278,668.  Specification of Letters Patent.  Patented Sept. 10, 1918.

Application filed October 9, 1917. Serial No. 195,507.

*To all whom it may concern:*

Be it known that I, FREDERIC E. IVES, a citizen of the United States, residing at Philadelphia, in the county of Philadelphia and State of Pennsylvania, have invented certain new and useful Improvements in Color Photographs or Films and Methods of Producing Same, of which the following is a specification, reference being had therein to the accompanying drawing.

This invention relates to color photographs or films and method of producing same. The invention involves both the arts of color photography and motion pictures, and constitutes an improvement in both arts.

In its broad aspect the object of the invention is to afford a simple, effective and convenient mode of producing a multicolor picture or print, and one which will be less complicated and quicker to carry out and yield a better product, having superior and more permanent coloring. More particularly, an object is to produce two, by which I mean at least two, differently colored images, to be successively produced and blended in the same member or carrier, thus obviating the necessity of attaching independently produced members. Broadly this object could be carried out by producing the images at the opposite exterior faces of the member, which may be of gelatin or other colloid, with preferably a celluloid core or base interior of the exterior faces; but it is an advantage and object of the present invention that the images are able to be produced within the body of a single colloid layer at one side of a transparent or celluloid carrier, which is the plan referred to in my prior Patent 1,170,540, of February 8, 1916. Having one face free from any image carrying layer, the improvement is peculiarly adaptable for use as a color motion picture film without liability to injurious defacement of the pictures. Other objects are to improve in various ways on the process of said prior patent, to afford a quick, simple and effective process with superior resulting product, and to permit the possibility during or after the photographic portion of the process of modifying the hue or tone of the colors at will, so that the effect of the final picture may be rendered artistically consonant with the subject photographed; and further objects and advantages will be elucidated in the hereinafter following description or will be apparent to those skilled in the art.

To the attainment of the above referred to objects and advantages the above invention consists in the novel processes, steps and products hereinafter described. First will be described one or more embodiments of the invention, and thereafter the novel features will be pointed out in the claims.

Two or more simultaneously exposed views or series of views will be supposed to have been taken from substantially a single viewpoint for the purpose of securing color selection negatives from which afterward the positives or diapositives are to be made. The two-color system will be supposed to be employed, for, although the three-color system might be used, the two-color is eminently more simple and is sufficiently satisfactory for general practical purposes.

In exposing for the view or series of views constituting the subject, there may be a red screen interposed in the path of the light rays or in some other way a selection of the red rays made, and in connection therewith a film sensitized specially for red rays may be employed. Thus red-selection negatives are obtained. Similarly a green screen and green sensitive film may be employed for securing green selection negatives.

In my aforesaid prior patent in a single gelatin layer a silver image was first produced at the top or exterior side and converted to blue-green, and subsequently a red dye image was added, also at the top of the same gelatin layer. This process is somewhat laborious and time-consuming, and not entirely free from difficulty and complication of method and manipulation, and the print could not easily be modified in tone as the conditions might require. The present invention differs from the prior patent in one or more of the following respects: I now first expose for the red positive image, and subsequently for the blue-to-green positive image, which could not be done in the prior patent because of the actinic obstruction that would be offered by the first image. In the present invention I do not locate both images at the same exterior side, but when placed in a single gelatin layer one is at the interior side next to the celluloid carrier. By this arrangement I am enabled to locate the first exposed or the silver image at the interior side. In this way the red image will be formed at the interior surface of the colloid, and will not interfere with the subsequent production of the blue-to-green image at the exterior surface.

Figure 2:
Figure 3:
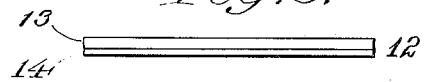
Figure 4:
Figure 5:
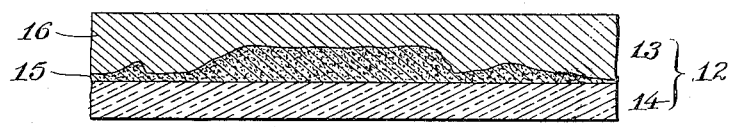
Figure 6:
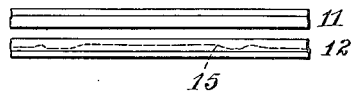
Figure 7:
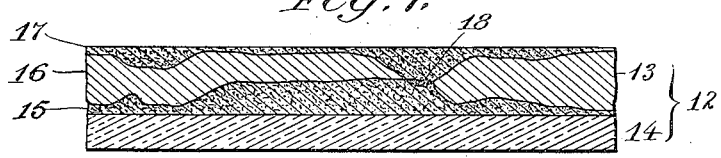
Figure 8:
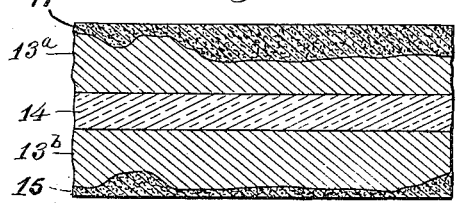

In the accompanying drawings showing embodiments of my invention, Figure 1 may be considered a side elevation of a green-representing negative facing downward, while Fig. 2 is a similar view of a red-representing negative facing downward. Fig. 3 represents a sensitized colloid film facing upward, and on which the final picture is to be produced. Fig. 4 illustrates the step of printing from the green-representing negative upon the film. Fig. 5 on an enlarged scale is a sectional view of the film or print after the production of the first image. Fig. 6 is an elevation showing the step of printing from the red-representing negative to form the second image in the film. Fig. 7 is an enlarged section showing the final print or picture containing both images. Fig. 8 shows a modification in certain respects.

The present invention may conveniently be carried out in the manner which will now be specifically described. Assuming the two-color system, we commence with the set of color selection negatives 10 and 11. The first negative 10 may for example represent the green components of the picture, and the negative 11 the red components. Eventually the final picture will include a blue or green positive from the first or red-representing negative, and a red image from the green-representing positive. When I say red I mean any of the suitable reds, and not necessarily a pure red; and the complementary positive may be a blue or a green or anything between them, and may be described as blue-to-green. One of the two negatives 10 or 11 is preferably a reversed negative, for example, the green-representing negative 10, which may be used for rear exposure through the carrier of the print, as will subsequently be described.

The print or film 12, in which the positive images are to be formed and blended, comprises colloid portions 13, supported preferably on a transparent or celluloid carrier 14. The colloid might be on both sides of the carrier, but it suffices to employ a single colloid layer at one side of the carrier, since in my preferred embodiment both of the positive images are formed in the single layer.

The first step in the process is to expose by means of the first negative and form an image at one surface of the colloid portion of the print or film member 12. It is to be assumed that the colloid layer 13 is sensitized with silver haloid. The first printing is preferably by the green-representing negative 10, and, as shown in Fig. 4, this negative is used in such way as to effect the exposure at the rear or through the carrier 14, so that the resulting image will be confined largely to that side of the gelatin layer which is next to its carrier and may be referred to as the bottom or interior surface. The negative 10 will preferably be a reversed negative, as before stated.

The procedure of making the first or silver image at the interior surface of the gelatin might in some cases be reversed by making it at the exterior or top surface, and subsequently making the complementary image at the interior surface, but the first mentioned procedure is substantially better, simpler and is my preferred embodiment.

Having been exposed, the silver image may be developed and will be found confined to the interior surface of the gelatin in a manner that will be roughly understood from the enlarged cross-section Fig. 5, in which the colloid layer 13 is shown as having the silver image 15 at its bottom side with a mass of clear gelatin 16 extending between the image and the top surface.

This silver or bottom image, it will be understood, is a black and white image, but according to my invention is subsequently to be color-toned, and in the preferred embodiment is to be toned a red color, as will be described in detail. This color toning may be performed subsequently to the exposure and printing for the second or blue-to-green image, although, as described, the exposure for the red or bottom image is performed prior to the exposure for the blue-to-green or top image.

The silver image 15 being developed, the gelatin layer may thereupon be easily resensitized for exposure at its exterior surface. A convenient mode for producing the blue-to-green image is the iron process. The colloid layer may be subjected to a 2% bath of green ferric ammonium citrate with an immersion of about five minutes, followed by blotting off and drying.

We are now enabled to print at the top or exterior surface of the gelatin by means of the red-representing negative 11, which of course is to be accurately registered with the silver image already formed. This printing step is indicated in Fig. 6. After exposure the iron-salt print is converted into a cyanotype blue-print by development with a 1% solution of potassium ferricyanid applied for about 10 seconds, and then immediately washed out again.

We now have an insoluble silver image at one side and an insoluble blue-to-green image at the opposite side of the colloid layer. The latter may be described as a pigment image to distinguish it from a water soluble dye, the former being insoluble and not liable to wash out in subsequent steps. I will now describe how the silver image is to be converted into an insoluble or pigment image of red color.

I first convert the silver image into cupric ferricyanid by a substantial soaking between 15 and 60 minutes in a copper toning bath, which may be made up as needed by mixing equal parts of the two following stock solutions A and B:

*Solution A.*

| | |
|---|---|
| Cupric sulfate | 7 grams. |
| Potassium citrate | 28 grams. |
| Water | 1000 c. c. |

*Solution B.*

| | |
|---|---|
| Potassium ferricyanid | 6 grams. |
| Potassium citrate | 28 grams. |
| Water | 1000 c. c. |

This converted image may be fixed in a bath of sodium thiosulfate, which leaves a transparent copper red image, which with the blended cyanotype blue-print gives approximately what is required under the two-color process; but the fixing out in sodium thiosulfate may sometimes be advantageously omitted.

The blue-to-green or exterior image is indicated at 17 in Fig. 7, it being for the most part completely separated from the interior image 15 by the clear gelatin 16, but possibly, owing to extreme depth of both images at one point, the two may overlap, as indicated at 18, without, however, any material effect upon the process or product.

For a color photograph or film having a plurality of images blended in a single layer, the copper toning of a silver image to give an insoluble copper-salt image as one of the images is particularly advantageous. Its production does not interfere with that of another image. The steps are quickly performed, especially the silver printing, which is important in motion picture printing processes, and the results are simple and cheap, and yet permanent and satisfactory, as I can secure an excellent red by the copper toning process. Also, if desired, this improvement permits the silver image to be first formed and the toning postponed until after the second color image is produced.

A very important part of the present invention is its flexibility, permitting a considerable latitude of modification of color components. Commercially it would be impracticable to be compelled to rely in all cases upon the blending of the blue-green of the cyanotype with the copper red of the converted silver image, the latter being usually too pale to coördinate satisfactorily, and insufficiently deep and brilliant in hue. I will therefore describe how the copper red image can be modified at will to suit the character of the subjects photographed, and how also the cyanotype print may be modified if requisite.

I have ascertained that the copper-toned red print is capable of acting as an effective mordant for basic dyes, which permits the image to be modified both in hue and density by submitting it to the action of weak baths of suitable basic dye stuffs, the colors to be chosen according to the requirements of the subject.

I prefer to first form both of the pigment images, as already described, and subsequently modify the hue of the copper image by the dye bath treatment, thus enabling the effect to be observed and the process stopped at the point dictated by the judgment of the photographer. This procedure is practicable, because the basic red dye which is mordanted by the copper image does not alter and is not effected by the cyanotype image.

Suitable dyes for the purpose are fuchsin, giving a purplish red, or auramin, a yellow, or a combination of these in such proportions as experience and the character of the subjects dictate. The principle of this modifying process is that the copper image immersed in the dye bath absorbs the dyes which add the desired color to the copper image, strengthening and altering its tone or depth. For general purposes a bath made up as follows is satisfactory:

| | |
|---|---|
| Fuchsin | 0.13 grams. |
| Auramin | 0.26 grams. |
| Water | 5000 c. c. |
| Acetic acid (glacial) | 8 c. c. |

The dyes may be first dissolved in a little alcohol and then added to the water, and the dyeing process should be continued sufficiently to reach the limit of action, which may be in one or more hours. Certain advantages may sometimes be gained by dyeing successively in baths of different single dyes. Any unmordanted dye remaining in and staining the gelatin after the dyeing should be dissolved out by soaking the print in water, preferably made slightly acid by the addition of acetic acid.

The described step of reinforcing the copper red image may be performed either before or after dissolving out the silver ferricyanid by sodium thiosulfate. I prefer to perform the dye treatment first, and afterward fix the image. When the original silver image is thin, the fixing step may sometimes be entirely omitted.

Any error in reinforcing the copper red image may be corrected. Insufficient depth or improper tone would call for a second dyeing operation, and, if the color is too deep to properly coördinate with the blue-to-green image, the red image may be correctly reduced the desired extent merely by soaking in water slightly acidified by acetic acid.

The cyanotype blue-print may be somewhat varied in hue from its natural peacock blue color to a greener shade by developing with potassium ferricyanid mixed with some other suitable chemical agent such as potassium permanganate. The cyanotype print after production may be intensified, if desired, by a few seconds immersion in water containing a drop or two of sulfuric acid in each 500 c. c., followed by washing.

A satisfactory print is obtainable when the silver image is copper-toned prior to the iron sensitization for the cyanotype print. With this process the blue print can be modified to a greener hue by treatment with extremely dilute potassium bichromate solution rendered slightly acid with sulfuric acid; while the copper red print also can then be intensified or modified in hue by mordant dyeing, as described. While a third color could be added in the general manner indicated in my said prior patent, the complications attendant on this render the two-color system commercially important, notwithstanding that the exhibited colors will be only approximately accurate representations of the original. It is this approximation of color, and additionally the desire of the motion picture artist to secure certain color tones or effects, which render the flexibility of the process and adaptability to color modification important for the purposes of the present invention.

While I do not prefer to place the two images at opposite sides of the celluloid carrier, this, if done, would be performed, as previously described, by first producing the red print in the colloid at one side through exposure for the silver image and subsequent copper toning, and at the opposite side sensitizing the other colloid coating and exposing for the blue-to-green image after the exposure of the silver salt.

The product of my invention in its preferred form is a color photograph or film comprising colloid material or layer containing a red copper toned silver image blended with a blue-to-green image; the two images being in different portions of the colloid, preferably at opposite sides of a single layer; and the copper-toned image being additionally mordant-dyed to reinforce it.

In the Fig. 8 modification where the colloid consists of two layers 13$^a$ and 13$^b$ on either side of the core or carrier 14, the first exposed and developed image 15 will be understood to be the silver image which is to be converted to a red color located in one of the colloid layers, while the subsequently exposed image 17, which may be a cyanotype print, is in the opposite colloid layer.

It will thus be seen that I have described a color photograph or film and method of producing the same embodying the principles and attaining the objects and advantages of the present invention, and further advantages will be apparent to those skilled in the art. Since many matters of procedure, manipulation, ingredients, arrangement, combination and other features may be variously modified without departing from the underlying principles, I do not desire to limit the invention except in so far as specified in the appended claims.

What is claimed is:

1. A color photograph or film comprising a layer of colloid material containing a red copper-toned silver image blended with a blue-to-green image.

2. A color photograph or film comprising a layer of colloid material containing a red copper-toned and mordant-dyed silver image blended with a blue-to-green image.

3. A color photograph or film comprising a layer of colloid material containing in different portions of the colloid respectively a red copper-toned silver image blended with a blue-to-green image.

4. A color photograph or film comprising a colloid layer supported on a transparent carrier and containing at the exterior and interior surfaces of said layer respectively two differently colored blending images.

5. A color photograph of film comprising a colloid layer supported on a transparent carrier and containing at the exterior and interior surfaces of said layer two differently colored blending images, one a red copper-toned silver image and the other a blue-to-green image.

6. A color photograph or film comprising a colloid layer supported on a transparent carrier and containing at the exterior and interior surfaces of said layer two differently colored blending images, one a red copper-toned and mordant-dyed silver image and the other a blue-to-green image.

7. A color photograph or film comprising a colloid layer supported on a transparent carrier and containing at the exterior and interior surfaces of said layer a red image and a blue-to-green image.

8. A color photograph or film comprising a colloid layer supported on a transparent carrier and containing at the exterior and interior surfaces of said layer a red image and a blue-to-green image, the red image at the interior face being a silver image copper-toned and mordant-dyed.

9. A color photograph or film comprising a layer of colloid supported on a carrier and containing in the same colloid layer a plurality of blending images of different colors, one a copper toned silver image.

10. A color photograph or film comprising a layer of colloid supported on a carrier and containing in the same colloid layer a plurality of blending images of different colors, one a copper toned silver image of a red color, and another a blue-to-green image.

11. Method of producing a color photograph or film from suitable color selection negatives consisting in exposing and producing a red image in a colloid member and, subsequently to exposing for the red image, producing a blue-to-green image in the same member.

12. Method of producing a color photograph or film from suitable color selection negatives consisting in first producing a silver image in a colloid member, copper-toning it to a red color, and producing a blue-to-green image in the same member subsequently to producing the silver image.

13. Method of producing a color photograph or film from suitable color selection negatives consisting in first producing a silver image in a colloid member, copper-toning and mordant-dyeing it to a red color, and producing a blue-to-green cyanotype image in the same member subsequently to producing the silver image.

14. Method of producing a color photograph or film from suitable color selection negatives consisting in first producing a silver image in a colloid member, and later copper-toning it to a red color, and subsequently to producing a silver image resensitizing the colloid with ferric salt and producing a blue-to-green cyanotype image in the same member.

15. Method of producing a color photograph or film from suitable color selection negatives consisting in first producing a silver image in one portion of a colloid member, color-toning it, and producing a second image of distinct color in a different portion of the member subsequently to producing the silver image.

16. Method of producing a color photograph or film from suitable color selection negatives consisting in first producing one color image at one surface of a given colloid layer and subsequently a different color image at the opposite surface of the same colloid layer.

17. Method of producing a color photograph or film from suitable color selection negatives consisting in first printing a silver image in a given colloid layer by exposure from one side, and subsequently color-toning such image, and printing by exposure from the opposite side to produce in the same colloid layer a blended image of a different color subsequent to printing the silver image.

18. Method of producing a color photograph or film from suitable color selection negatives consisting in first printing a silver image through the transparent base of a sensitized colloid layer, and subsequently color-toning it, and printing by face exposure a second image of different color in the same layer subsequent to printing the silver image.

19. Method of producing a color photograph or film from suitable color selection negatives consisting in first printing a convertible silver image at one surface of a colloid layer by exposure through its carrier, and subsequently copper-toning and mordant-dyeing this to a red color, and after such silver-printing, sensitizing the same colloid layer with a ferric salt and printing a cyanotype image on the opposite face.

20. Method of producing a color photograph or film from suitable color selection negatives consisting in first printing a convertible silver image at the interior surface of a colloid layer by exposure through its carrier, then sensitizing the exterior surface of the same colloid layer and printing a color image thereat in register with the silver image, and thereafter color-toning the silver image to a different color.

21. Method of producing a color photograph or film from suitable color selection negatives consisting in first printing a convertible silver image at the interior surface of a colloid layer by exposure through its carrier, then sensitizing the exterior surface of the same colloid layer and printing a blue-to-green image thereat in register with the silver image, and thereafter copper-toning the silver image.

22. Method of producing a color photograph or film consisting in producing in a single layer of colloid or like material containing a sensitive silver salt, a plurality of blending images, one of them by the process of exposing and developing a silver image and copper toning the same to give a suitable color, and the other by a different process to give a different color.

23. Method of producing a color photograph or film consisting in producing in a single layer of colloid or like material containing a sensitive silver salt, a plurality of blending images, one of them a red image by the process of exposing and developing a silver image and copper toning the same to give a suitable red color, and the other by a different process to give a blue-to-green image.

24. Method of producing a color photograph or film consisting in producing in a single layer of colloid or like material containing a sensitive silver salt, a plurality of blending images, one of them a red image by the process of exposing and developing a silver image and toning the same to give a suitable inorganic red color, and the other by a different process to give a blue-to-green image.

25. Method of producing a color photograph or film consisting in producing in a single layer of colloid or like material a silver image, and thereafter producing a blue-to-green image in registry therewith, and thereafter converting the silver image to a red color.

26. Method of producing a color photograph or film consisting in producing in a single layer of colloid or like material a silver image, and thereafter sensitizing for and producing a cyanotype blue-to-green image in registry therewith, and thereafter copper toning the silver image to convert it to a red color.

27. Method of producing a color photograph or film consisting in producing at the two opposite sides of a single layer of colloid or like material containing a sensitive silver salt, a plurality of blending images, one of them by the process of exposing and developing a silver image and copper toning the same to give a suitable color, and the other by a different process to give a different color.

28. Method of producing a color photograph or film consisting in producing in a single layer of colloid or like material containing a sensitive silver salt, a plurality of blending images, the first by printing through the back side and developing into a silver image, and the second by printing at the front and developing to a suitable color, followed by converting the silver image to a contrasting color.

In testimony whereof I have affixed my signature hereto.

FREDERIC EUGENE IVES.